US007227355B2

(12) United States Patent
Chen et al.

(10) Patent No.: US 7,227,355 B2
(45) Date of Patent: Jun. 5, 2007

(54) METHOD OF DETECTING, QUANTIFYING AND CORRECTING BOREHOLE CONTAMINATIONS FROM MULTI-FREQUENCY, MULTI-SENSITIVE-VOLUME NMR LOGGING DATA

(75) Inventors: Songhua Chen, Katy, TX (US); Gigi Zhang, Houston, TX (US); Daniel Georgi, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/855,230

(22) Filed: May 27, 2004

(65) Prior Publication Data

US 2005/0264285 A1    Dec. 1, 2005

(51) Int. Cl.
*G01V 3/00* (2006.01)
(52) U.S. Cl. ...................................................... 324/303
(58) Field of Classification Search ................. 324/303
See application file for complete search history.

(56) References Cited

U.S. PATENT DOCUMENTS

| | | | | |
|---|---|---|---|---|
| 5,055,788 A | * | 10/1991 | Kleinberg et al. | 324/303 |
| 5,363,041 A | * | 11/1994 | Sezginer | 324/303 |
| 6,388,441 B1 | * | 5/2002 | Chen | 324/303 |
| 6,392,409 B1 | * | 5/2002 | Chen | 324/303 |
| 6,600,315 B1 | * | 7/2003 | Heaton et al. | 324/303 |
| 6,603,310 B2 | | 8/2003 | Georgi et al. | 324/303 |
| 6,690,167 B2 | * | 2/2004 | Reiderman et al. | 324/314 |
| 6,703,832 B2 | * | 3/2004 | Heaton et al. | 324/303 |
| 2005/0030021 A1 | * | 2/2005 | Prammer et al. | 324/303 |

* cited by examiner

*Primary Examiner*—Brij Shrivastav
*Assistant Examiner*—Dixomara Vargas
(74) *Attorney, Agent, or Firm*—Madan, Mossman & Sriram, P.C.

(57) ABSTRACT

Spin echo signals measured with a multifrequency NMR logging tool are analyzed to determine if one or more of the regions of examination associated with each of the frequencies has signal contamination from borehole fluids. A variety of different methods can be used for analysis. Corrected spin echo signals can be obtained and processed to give improved estimates of formation parameters.

41 Claims, 5 Drawing Sheets

METHOD OF DETECTING, QUANTIFYING AND CORRECTING BOREHOLE CONTAMINATIONS FROM MULTI-FREQUENCY, MULTI-SENSITIVE-VOLUME NMR LOGGING DATA

BACKGROUND OF THE INVENTION

1. Field of the Invention

The invention is related to NMR logging techniques in a downhole environment in petrophysical testing. In particular, the invention quantifies and corrects for contamination effects from contaminant materials located in a borehole.

2. Description of the Related Art

Nuclear Magnetic Resonance (NMR) has uses in many areas, including the fields of medicine, chemistry, non-destructive testing, and in well logging in the oil exploration industry. In the well logging industry, NMR wireline logging or measurement-while-drilling (MWD) instruments are useful for collecting information on earth formation properties and for characterizing reservoir fluids. NMR is used in determining properties such as porosity of the formation, permeability, the movable fluid volume (BVM), the clay bound volume (CBW) and bulk volume irreducible (BVI), as well as other formation and reservoir fluid properties.

In a typical NMR device used in logging, a permanent magnet produces a static magnetic field and establishes a direction of orientation for nuclear magnetic moments in the vicinity of the borehole. An RF field is applied in the plane perpendicular to the static magnetic field. Typically in the art, the static field $B_0$ is a function of distance from the tool. Thus, at a given applied frequency, the NMR resonance condition must be satisfied, wherein $$\omega = \frac{\gamma B_0}{2\pi} \quad (1)$$

where $\omega$ is the frequency of the RF field, and $\gamma$ is the gyromagnetic ratio. Nuclei that are influenced by the applied RF field typically lie within a certain volume, named the sensitive volume. For a selected operating frequency, the location and size of the sensitive volume are determined by the magnetic field intensity, the field gradient and the effective bandwidth of the pulse. In multi-frequency logging, a discrete number of closely spaced and substantially non-overlapping sensitive volumes can be obtained. The union of these sensitive volumes is defined as the region of examination of a given tool with a given acquisition method.

In centralized tools, the region of examination is a cylindrical shell which is coaxial with the permanent magnet, although other spatial arrangements can be used. Since the region of examination typically lies close to the surface of the borehole cavity, a perfectly coaxial alignment of the tool and borehole wall, in which the borehole wall is circular and smooth, would yield optimal values of echo signals. Often though, geometric anomalies concerning the logging tool and the surface of the borehole will result in portions of the region of examination lying inside the borehole cavity rather than inside the rock formation. As one example of possible anomalies, the tool can be off-axis with the borehole and additionally can be lying against one side of the borehole, revealing a portion of the region of examination to the borehole cavity. In another example, the borehole might have an elliptical cross-section rather than a circular one. In yet a third possibility, there can be a significant amount of washout, where certain segments of the wall have separated and fallen away, leaving a cavity to one side of the borehole.

Current NMR logging or MWD instruments investigate formations only up to a few inches from the borehole wall. Therefore, irregularities in borehole geometry (such as an elliptical borehole shape) and/or formation damage (such as a cave-in) can affect these shallow NMR measurements. Such adverse effects are referred to as borehole contamination. The severity of the borehole contamination problem depends on the location of the NMR sensitive volume, which is often referred to as the depth of investigation, or DOI. For NMR instruments that can acquire data using multiple frequencies, the DOI is frequency-dependent and can be positively determined once the tool's magnetic configuration and its operation frequencies are known. Thus, the severity of borehole contamination to the NMR data is also frequency-dependent.

Drilling mud is typically used to facilitate drilling, and therefore yields a constant presence within the borehole. Typically, drilling mud is either oil-based (including synthetic oil-based), water-based, or glycol-based and hence has a large number of hydrogen nuclei. Due to the large number of hydrogen nuclei, the mud is a strong source of contamination in NMR spin echo signals, and the contamination signals can be greater than the desired signals obtained from the rock formation. To avoid receiving signals from within the borehole fluid, it is clearly desirable to have the region of examination contained within the rock formation and outside the borehole. When some portion of the region of examination lies within the borehole, NMR signals are received from material that is contained inside the borehole, usually drilling mud.

Drilling mud typically contains 80% or more of fluids. This is much higher than the fluid content of the surrounding rock formation. Contamination of borehole signals in NMR by mud signals spoils all critical petrophysical estimates including porosity, permeability, and $T_2$ distribution. U.S. Pat. No. 6,603,310, to Georgi et al., having the same assignee as the present invention, discusses a method for correcting downhole NMR data contaminated by signals from borehole fluids. Correction may be made using either a reference porosity obtained from an independent source (such as density log). Alternatively, the amount of contamination is estimated with the aid of a standoff measuring device to determine the fractional volume of the region of investigation of the NMR tool that lies within the borehole. The characteristics of the borehole fluids are either known or are measured within the borehole at a depth where the entire volume of investigation lies within the borehole or from laboratory characterization of the mud sample.

In general, there are two categories of borehole mud: water-based mud (WBM) and oil-based mud (OBM). For NMR signals, glycol based mud has a behavior that is intermediate to WBM and OBM, but for simplicity, we include glycol based mud as a WBM in the discussion of the present invention. Both OBM and WBM contain clay particles, additives, emulsifiers, water, and in the case of OBM, base oil. The NMR signal in borehole mud for wells drilled with WBM is mainly from the water. In the case of OBM, the signal is mainly due to water and oil. These fluid molecules are surrounded by a large amount of clay particles, smaller in size but abundant in surface areas, which effectively shorten the relaxation time of mud fluids. Oil in the OBM may also wet the clay surfaces. Emulsifiers further homogenize the OBM, which is necessary to make base oil and clay particles well mixed and not spontaneously separated.

The method of Georgi provides one of the unique parameters from NMR logging: the bulk volume irreducible (BVI). The reliability of the method of Georgi is largely dependent on the correctness of the reference porosity, which is usually the density porosity. However, because density porosity is also a shallow DOI measurement, density porosity itself can be contaminated by borehole rugosity. If both NMR and reference porosities are contaminated, the comparison of the two porosity estimates may be inconclusive and may not properly identify the extent of borehole contamination problem. Moreover, even if the reference porosity is correct, it may be acquired with different vertical resolutions and from different logging passes. To match the vertical resolution and depths of the two different logs may introduce additional error. Therefore, it is indeed an advantage if a borehole contamination indicator is derived from NMR log data alone and the problem is corrected without the aid of a reference porosity.

A robust method for indicating borehole contamination benefits from being sensitive to the borehole contamination and insensitive to the field gradient changes associated with DOI. Also, insensitivity to random noise and processing artifacts are necessary characteristics of a robust indicator method. There is a need for detecting and correcting borehole contamination effects in NMR measurement techniques in multi-volume NMR logging. The present invention fulfills this need.

SUMMARY OF THE INVENTION

The present invention is a method and apparatus for well logging. A multifrequency NMR logging tool is conveyed into a borehole in the earth formation. Echo signals are acquired from a plurality of different regions of investigation at different depths of investigation. In one embodiment of the invention, this is accomplished by acquisition at a plurality of frequencies. Each of the plurality of frequencies has a different region of examination in the earth formation. In an alternate embodiment of the invention, different depths of investigation are obtained using a field shifting magnet. The echo signals are analyzed to obtain an indication of possible presence of a borehole fluid in at least one of the regions of examination. In one embodiment of the invention, a porosity associated with each of the different regions of examination is determined and the determined values of porosity are compared. The porosity determination may be done by inverting the echo signals. The echo signals may include trainlets with a short wait time, and analysis of the signals may be based on determination of the sum of echoes in the trainlets.

In another embodiment of the invention, the echo signals include both trainlets and regular echo trains. A simultaneous inversion of the trainlet and regular echo trains is carried out. A goodness of fit of the inversion is diagnostic of borehole fluid contamination.

In another embodiment of the invention, the echo signals comprise trainlets, and a transverse relaxation time ($T_2$) distribution of the borehole fluids is determined. This determination of borehole fluid relaxation time may be based on comparing corresponding echoes at one or more pairs of adjacent frequencies. This pairwise comparison is effective whether or not one of the trainlets has no signal from the borehole fluid.

The volume fraction of each of the regions of examination including mud may be determined. The determination of the volume fraction makes it possible to obtain corrected echo signals that can then be processed using prior art methods for obtaining at least one of a total porosity, a clay bound water, and a bound volume irreducible.

The echo signals may be obtained using a multifrequency NMR logging tool that includes a permanent magnet, a transmitter for producing pulsed RF fields at different frequencies, and a receiver for receiving the signals. A surface or downhole processor may be used for analyzing the signals.

BRIEF DESCRIPTION OF THE DRAWINGS

The present invention is best understood with reference to the accompanying figures in which like numerals refer to like elements and in which.

DETAILED DESCRIPTION OF THE INVENTION

The present invention addresses three aspects of correcting for borehole contamination of NMR signals. Firstly, the invention provides three methods for indicating borehole contamination that are useful for multiple-DOI NMR data. Secondly, the invention quantifies the fraction of sensitive volume that is contaminated by borehole mud. Thirdly, the invention provides a data processing method to restore the NMR time-domain data to a state corresponding to or approximates to 0% contamination.

Figure 1:
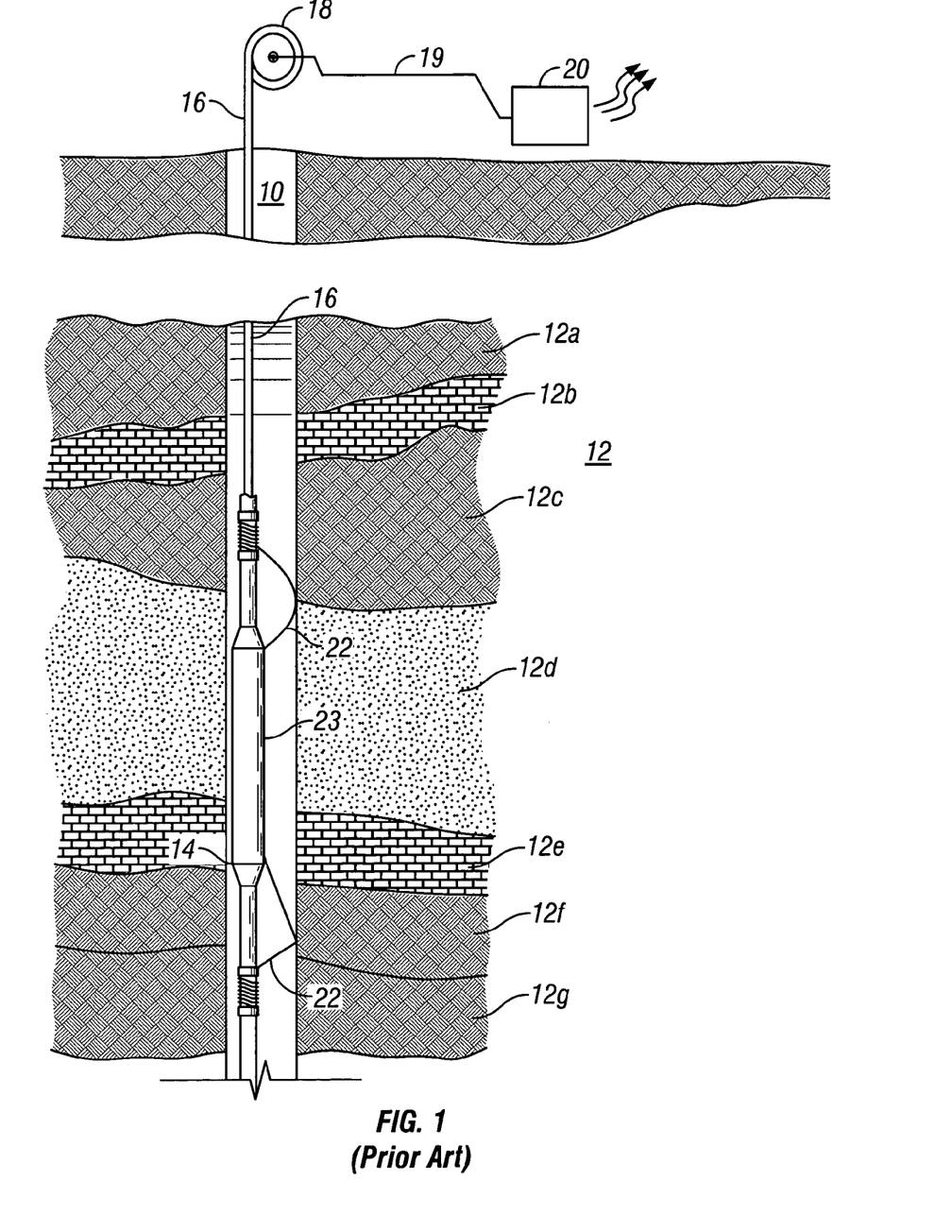
FIG. 1 shows a string of logging tools disposed within a borehole penetrating earth formations.

FIG. 1 (prior art) depicts a borehole 10 which has been drilled in a typical fashion into a subsurface geological formation 12 to be investigated for potential hydrocarbon producing reservoirs. An NMR logging tool 14 has been lowered into the hole 10 by means of a cable 16 and appropriate surface equipment represented diagrammatically by a reel 18 and is being raised through the formation 12 comprising a plurality of layers 12a through 12g of differing composition, to log one or more of the formation's characteristics. The NMR logging tool is provided with bowsprings 22 to maintain the tool in an eccentric position within the borehole with one side of the tool in proximity to the borehole wall. The permanent magnets used for providing the static magnetic field is indicated by 23 and the magnet configuration is that of a line dipole. Signals generated by the tool 14 are passed to the surface through the cable 16 and from the cable 16 through another line 19 to appropriate surface equipment 20 for processing, recording and/or display or for transmission to another site for processing, recording and/or display. A satellite link (not shown) may be provided for communicating data to and from a remote location. Some of the processing may be done by a downhole processor (not shown)

Figure 2:
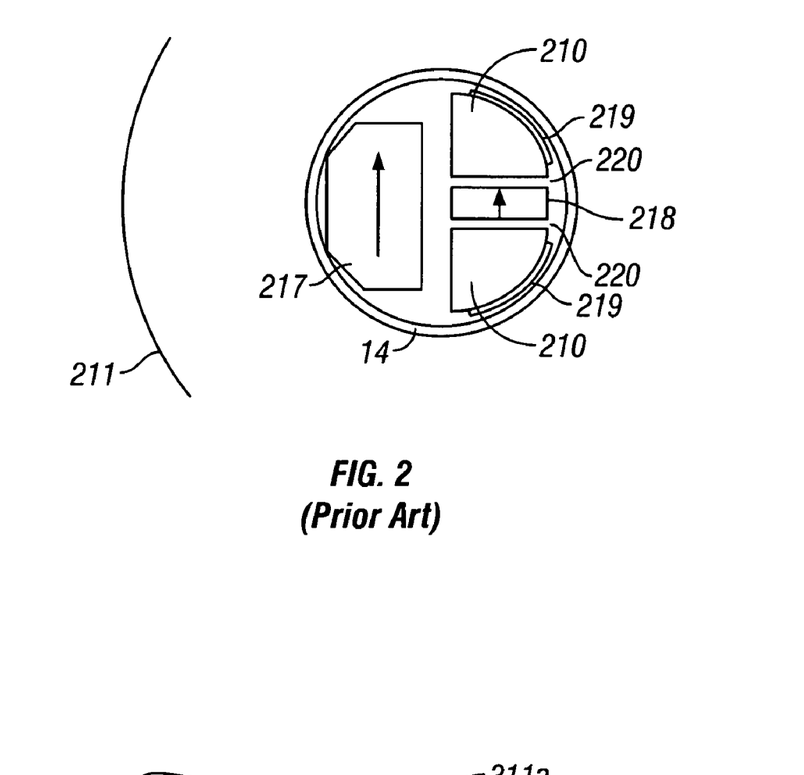
FIG. 2 shows a multi-frequency magnetic resonance measurement device suitable for use with the present invention.

FIG. 2 (prior art) schematically illustrates an exemplary embodiment of an apparatus suitable for use with the method of the present invention. This is discussed in detail in U.S. Pat. No. 6,348,792 to Beard et al. having the same assignee as the present invention, the contents of which are fully incorporated herein by reference. The tool described herein is only for exemplary purposes and any multifrequency NMR logging tool can be used for the present invention. The tool cross-sectional view in FIG. 2 illustrates a main magnet 217, a second magnet 218 and a transceiver antenna comprising wires 219 and core material 210. The arrows depict the polarization (e.g., from the South pole to the North pole) of the main magnet 217 and the secondary magnet 218. A noteworthy feature of the arrangement shown in FIG. 2 is that the polarization of the magnets providing the static field is towards the side of the tool, rather than towards the front of the tool (the right side of FIG. 2).

The second magnet 218 is positioned to augment the shape of the static magnetic field by adding a second magnetic dipole in close proximity to the RF dipole defined by the wires 219 and the soft magnetic core 210. This positioning moves the center of the effective static dipole closer to the RF dipole, thereby increasing the azimuthal extent of the region of examination. The second magnet 218 also reduces the shunting effect of the high permeability magnetic core 210 on the main magnet 217. In the absence of the second magnet, the DC field would be effectively shorted by the core 210. Thus, the second magnet, besides acting as a shaping magnet for shaping the static field to the front of the tool (the side of the main magnet) also acts as a bucking magnet with respect to the static field in the core 210. Those versed in the art will recognize that the bucking function and a limited shaping could be accomplished simply by having a gap in the core; however, since some kind of field shaping is required on the front side of the tool, in an exemplary embodiment of the invention, the second magnet serves both for field shaping and for bucking. If the static field in the core 210 is close to zero, then the magnetostrictive ringing from the core is substantially eliminated.

Within the region of examination, the static field gradient is substantially uniform and the static field strength lies within predetermined limits to give a substantially uniform Larmor frequency. Those versed in the art will recognize that the combination of field shaping and bucking could be accomplished by other magnet configurations than those shown in FIG. 2.

Still referring to FIG. 2, the transceiver wires 219 and core pieces 210 may be separated as far as possible towards the sides of the tool. This separation increases the transceiver antenna efficiency by increasing the effective RF dipole of the antenna and augments the shape of the RF magnetic field isolines so that they better conform to the static magnetic field isolines. The secondary magnet may be made of nonconducting material to minimize eddy currents induced by the RF field, thereby increasing the RF antenna efficiency. The antenna core may be made of a powdered soft magnetic material, other than ferrite, as disclosed in U.S. Pat. No. 6,452,388 to Reiderman et al. having the same assignee as the present invention and the contents of which are fully incorporated herein by reference. The antenna core has a high saturation flux density and comprises particles of powdered material small enough to be transparent to the RF magnetic field.

The new generation, monotonically-varying gradient-field NMR logging tools, such as MR Explorer$^{SM}$ tool by Baker Atlas and discussed in detail in U.S. Pat. No. 6,348,792 to Beard et al. having the same assignee as the present invention, for example, are capable of acquiring data using multiple frequencies. In a monotonically-varying gradient-field, each frequency defines a DOI of sensitive volume. The total frequency band of the logging tool defines the DOI range of the sensitive volumes for that logging tool. The shape of a sensitive volume slice varies according to the static and RF magnetic fields configuration. The DOI band of the current NMR well logging tools are typically in the vicinity of 2–5", which is relatively shallow and is easily subject to drilling induced borehole rugosity, cave-ins, and formation damages.

Figure 3:
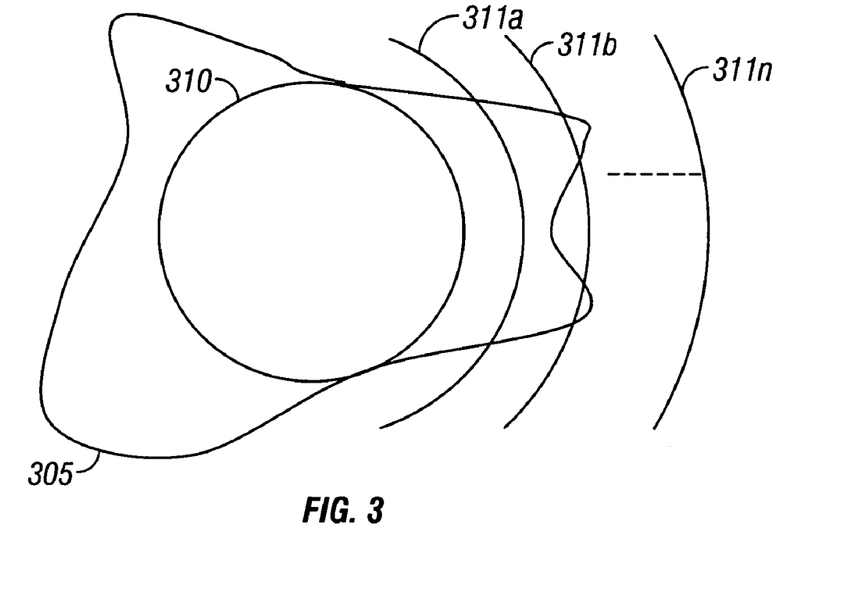
FIG. 3 shows an example of an asymmetric configuration with multiple sensitive volumes.

FIG. 3 shows a cross-section of a measurement device 310 within a borehole 305. As shown in the FIG. 3, a cross-section of the borehole is not necessarily smooth and the measurement device is not necessarily coaxial with the borehole. As the operating frequency of the multi-frequency NMR measurement tool decreases, protons in several sensitive volumes are excited and measured, with the depth of investigation (DOI) of the sensitive volume occurring at greater distances from the measurement tool. The sensitive volumes of FIG. 3 are labeled 311a, 311b, . . . 311N, where 311a is obtained using a highest frequency of the measurement device and 311N is obtained using a lowest frequency of the measurement device. As can be seen in the illustration of FIG. 3, sensitive volumes 311a and 311b lie sufficiently close to the measurement device 310 that a significant portion of the sensitive volume overlaps the borehole 305. In general, as the frequency increases, the contribution of borehole contamination to an obtained signal increases, since overlap of 311a is generally greater than the overlap of 311b. On the other hand, the sensitive volume of the lowest frequency is at a sufficient distance to have little or no overlap with the borehole and therefore is significantly free from the contamination of borehole signals. As an alternative to operating at different frequencies to get the different depths of investigation using the gradient tool disclosed in FIG. 3, it is also possible to get different depths of investigation using a field shifting magnet (not shown). Use of such a field shifting magnet is disclosed, for example in U.S. Pat. No. 6,720,765 to Edwards et al., having the same assignee as the present invention. What is important to practice of the present invention is to have a plurality of different regions of examination. In the discussion below, when reference is made to measurements made with a plurality of frequencies, it is to be understood that the measurements actually correspond to different regions of examination, and that if a field shifting magnet is used, then the frequencies need not be different.

The severity of borehole contamination, although irregularly dependent on DOI, usually decreases monotonically with DOI across the band of NMR sensitive volumes. In the case of large caved-in borehole regions, the contamination is constant over the DOI band. Monotonically-decreasing borehole contamination is generally more correctable.

In an exemplary embodiment of the present invention, borehole contamination can be determined using calculated values of apparent porosity. In operation, the nuclear spins are allowed to orient towards an equilibrium state parallel to the static magnetic field for a time TW. The nuclear spins are then tipped by a 90° pulse into a plane orthogonal to the static magnetic field. At the end of the 90° pulse, the spins precess around the static magnetic field and defocus with a time constant of $T_2$. In a CPMG sequence, the 180° pulses refocus the spins to produce a series of spin echoes. Raw NMR logging data often occurs in the form of a series of echoes (an echo train) separated by a constant, inter-echo time TE. The resultant echo train is indicative of the NMR signal decay. A CPMG sequence may be denoted by:

$$TW-90-(\tau-180-\tau-echo)_n$$

where TW is a wait time, 90 is a 90° tipping pulse, 180 and is a 180° refocusing pulse and $2\tau=TE$ is the interecho spacing. A modified CPMG sequence wherein the tip angles of the refocusing pulses are less that 180° is disclosed in U.S. Pat. No. 6,153,153 to Reiderman et al, having the same assignee as the present invention and the contents of which are fully incorporated herein by reference.

A mathematical representation of this signal can be written as:

$$ECHO_k(t=kTE, f) = \sum_i \phi_i \exp\left(\frac{-kTE}{T_{2int,i}}\right) \exp \quad (1)$$

$$\left(-\frac{\gamma^2 G_f^2 TE^2 D_i}{12} kTE\right)\left(1 - \exp\left(\frac{-TW}{T_{1i}}\right)\right)$$

$$= \sum_i \phi_i R_1(k, T_{2int,i}) R_2(k, G_f, D_i)$$

$$R_3(T_{1i}, TW)$$

where $\phi_i$ is the $i^{th}$ component porosity (volume fraction of the $i^{th}$ component of the fluid occupied formation), TW is the wait time, $G_f$ is the gradient at frequency f, and D is the diffusivity which varies according to the fluid types, $T_1$ and $T_2$ are the longitudinal and transverse relaxation times (also fluid dependent). The relaxation exponentials are represented on the right hand side of Eq. (1) as $R_1$, $R_2$ and $R_3$. $R_2$ is the only factor in Eq. (1) that depends on frequency and thereby also depends on field gradient. $R_2$ may be expressed as:

$$R_2(k, G_f, D_i) = \exp\left(-\frac{\gamma^2 G^2 TE^2 D_i}{12} kTE\right). \quad (2)$$

One commonly-used method to interpret data is to lump the $R_1$ and $R_2$ factors together to form an apparent $T_{2i}$, where $$\frac{1}{T_{2i}} = \frac{1}{T_{2int,i}} + \frac{\gamma^2 G_f^2 TE^2 D_i}{12}. \quad (3)$$

Using Eq. (3) a linear inversion operation [ref: C. T. Chen, "Introduction to Linear System Theory," Holt, Rinehart and Winston, New York, 1970] is applicable to the echo train data, using a multiple-exponential model with preset $T_{2i}$ values. The resultant $T_2$ distribution bin porosity—$\phi_i(T_{2i})$ is obviously gradient dependent, even for a fixed TE and as TW→∞. The inverted relaxation time spectrum enables derivation of petrophysical parameters of the formation under investigation. For example, total porosity is obtainable simply by summing up all partial porosities;

$$\phi = \sum_i \phi_i(T_{2i}) \quad (4)$$

For signals obtained from a volume having borehole contamination, the contaminated echo trains are partly contributed from fluids inside the formation and partly from fluids in the borehole mud. To extend the model for contaminated echoes, Eq. (1) can be modified to obtain:

$$ECHO_k(t=kTE, f) = \quad (5)$$

$$\sum_i \phi_{iF}(1-\Delta_f) R_1(T_{2int,F,i}) R_2(G_f, D_{F,i}) R_3(T_{1,F,i}, TW) +$$

$$\sum_i \phi_{imud} \Delta_f R_1(T_{2int,mud,i}) R_2(G_f, D_{mud,i}) R_3(T_{1,mud,i}, TW)$$

where subscript notations F and mud stand for formation and borehole mud, respectively, and $\Delta_f$ is the fraction of sensitive volume occupied by the borehole signal, at the given frequency f The porosity estimated from a borehole-contaminated sensitive volume (e.g. 311a of FIG. 3) is expressible as a summation of fluid and mud signals:

$$\phi_{UC,f} = \sum_i [\phi_{iF}(1-\Delta_f) + \phi_{i,mud}\Delta_f] \quad (6)$$

$$= \sum_i [\phi_{iF} + \Delta_f(\phi_{i,mud} - \phi_{iF})].$$

Because the bin porosity of mud is typically much greater than that of the formation ($\phi_{imud} >> \phi_{iF}$), the uncorrected porosity $\phi_{UC,f}$ is always overestimated. Furthermore, since $$\Delta_{f_1} \leq \Delta_{f_2} \leq \ldots \leq \Delta_{f_N} \text{ for } f_1 \leq f_2 \leq \ldots \leq f_N, \quad (7)$$

the uncorrected porosity is frequency dependent. For the corresponding situation where a field shifting magnet is used, by proper indexing of the regions of examination, the condition $\Delta_{f_1} \leq \Delta_{f_2} \leq \ldots \leq \Delta_{f_N}$ is still satisfied. Since porosity measurement is independent of the magnetic field gradient change associated with DOI, the porosity-based borehole contamination indicator satisfies at least one of the criteria of a robust borehole contamination indicator. It varies with frequency monotonically if borehole contamination occurs. However, because porosity is a property derived from the $T_2$ distribution, it is susceptible to artifacts and accuracy of the processing method (such as artifacts obtainable through inversion) and to the uncertainties induced by noise.

In another embodiment of the invention, a sum of echoes, hereafter abbreviated as SE, enables determination of the borehole contamination. SE is much less affected by random noise than the porosity method described above. When noise is inherent in the signal, the echo train $ECHO_k$ is a summation of signal and noise:

$$ECHO_k = S_k + N_k, \quad (8)$$

Since the signal $S_k$ is coherent, a summation of echoes amplifies the signal response. On the other hand, since the noise $N_k$ is incoherent, it is not similarly amplified upon summation. Thus, in general:

$$\frac{\sum_k S_k}{\sum_k N_k} \gg \frac{S_k}{std(N_k)} \equiv SNR_k. \quad (9)$$

where $std(N_k)$ is the standard deviation of noise $N_k$.

Applied to Eq. (1), SE is the summation of echoes over index k, ($ECHO_k$). Both $R_1$ and $R_2$ factors are affected by such a summation. Although $R_1$ is independent of the applied frequency and of the magnetic field gradient, $R_2$ does depend on the field gradient. However, this dependence on field gradient is negligible in the case where:

$$R_2 \approx 1 \qquad (10)$$

is valid for all excitation frequencies. When Eq. (10) is satisfied, SE is then approximately independent of frequency and the associated magnetic field gradient G, thereby enabling a robust borehole contamination indicator.

A quick observation shows that Eq. (10) is satisfied when $$\frac{\gamma^2 G_f^2 TE^2 D}{12} kTE \ll 1 \qquad (11)$$

for all k=1, 2, ..., N. The only controllable parameters of Eq. (11) are the number of echoes, N, and the inter-echo spacing TE. (The gyromagnetic ratio $\gamma$ is determined by the nuclear species NMR is sensing, $G_f$ is determined by the hardware design and frequency, and D is determined by the in-situ fluids.) Therefore, the number of echoes included in the SE processing can be chosen sufficiently small (i.e., N is small) and TE can be chosen sufficiently short so that Eq. (11) is approximately valid.

For the purposes of the present invention, determination of porosity from the spin echo signals or the summation of spin echo signals may be collectively referred to as a reduction of the spin echo signals.

In typical multi-frequency NMR logging measurements (see Chen et al, SPE paper 48841, 2003; ibid, SPWLA paper QQ, 2003), partially polarized short echo trains, hereinafter referred to as trainlets, are often acquired for the purpose of estimating clay bound water. Because clay bound water relaxes faster than most other in-situ fluid types, acquisition requires very high quality echo data. This high quality is achieved by performing a large number of repeated measurements and adding these identical measurements. Noise is minimized as a result. The large number of repetition ensures that the trainlets have a high SNR and even higher $$\frac{\sum_k S_k}{\sum_i N_k}.$$

High-quality, partially-polarized CBW trainlets are ideally suited for use in SE summation. Both WBM and OBM are expected to have very short relaxation times. Depending on the constituents of the mud, the relaxation time for WBM is often in the range of 1–10 ms, and for OBM is somewhat longer, but can still be in the millisecond range. In order to save total data acquisition time, trainlets are acquired with short wait time TW, usually in the neighborhood of 20–30 ms. Such short TW is sufficient to polarize clay bound water and to significantly polarize mud and BVI, but is insufficient to polarize the movable water, lighter oil, gas, and OBM filtrates. Therefore, trainlets and their derivative $SE_{trainlet}$, are heavily weighted towards short $T_2$ components, which include mud signals. As the relaxation time of the whole mud is short, the dependence of $SE_{trainlet}$ on DOI is more pronounced than the porosity method.

Figure 4:
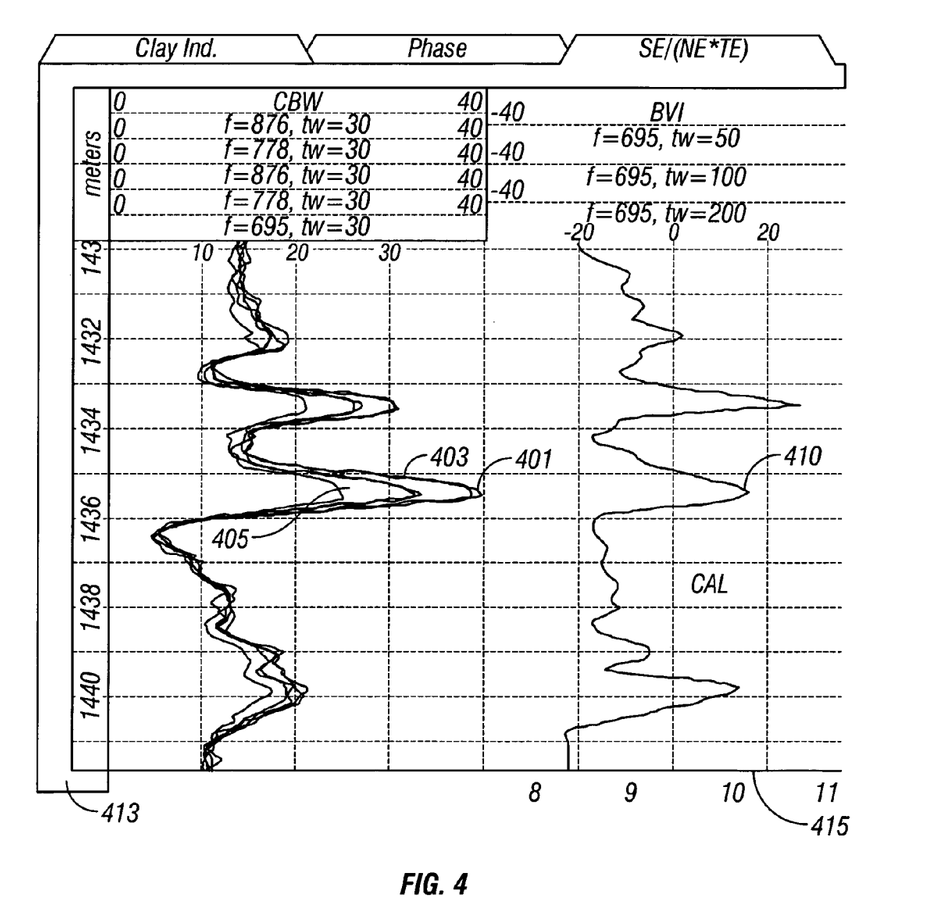
FIG. 4 shows an acquisition pulse sequence that includes multiple echo trains and stacked trainlets of the MR Explorer$^{SM}$ of Baker Hughes.

FIG. 4 shows an example of identifying borehole contamination to the NMR data using three frequency SE trainlet indicator. SE trainlet data is shown on track 413. Three frequencies are applied at 876 kHz, 778 kHz, and 678 kHz, each having a wait time TW=30 ms. SE trainlet data obtained at 876 kHz are seen in curve 401. SE trainlet data obtained at 778 kHz are seen in curve 403, and SE trainlet data obtained at 695 kHz are seen in curve 405. Calibration data (CAL) is shown on the curve 410 of track 415. Contaminated depths are shown to be consistent between $SE_{trainlet}$ and CAL. The $SE_{trainlet}$ is frequency dependent in the contaminated depths. The discrepancy between frequencies is clearly observed in FIG. 4. The higher frequency curves of 401 and 403 (shallower the DOI) give rise to higher $SE_{trainlet}$, indicating a severe contamination. Also, the $SE_{trainlet}$ data obtained at the same frequency agree with one another, indicating very little discrepancy due to noise.

Two identical trainlets acquired at the same frequency should have almost identical corresponding $SE_{trainlet}$. The comparison of two such $SE_{trainlet}$ can be used as a quality check to verify the noise-induced uncertainties is well below the discrepancies between two $SE_{trainlet}$, associated with two different DOIs. FIG. 4 shows such a quality check through comparison of track 401 with track 403 or through comparison of track 402 with track 404.

Figure 5:
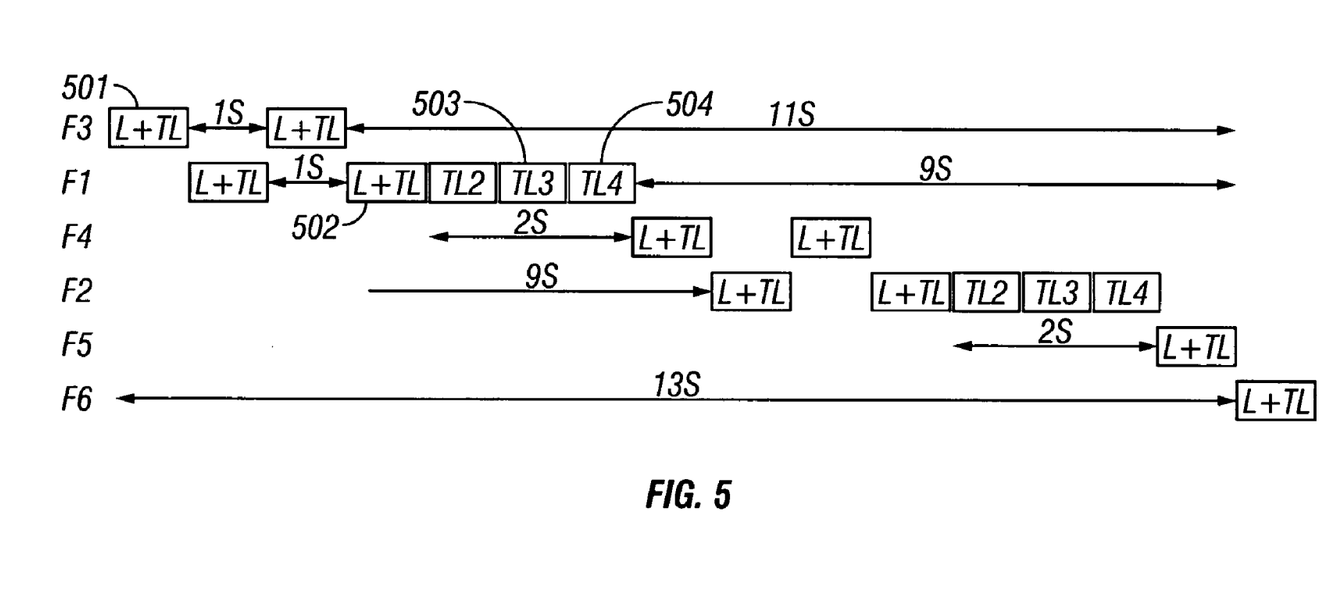
FIG. 5 shows the use of three frequency $SE_{trainlet}$ indicator in identifying borehole contamination.

In a yet another embodiment of the invention, a borehole contamination indicator is based on comparing the goodness of fitting ($\chi^2$) to the standard deviation of noise among all echo trains and trainlets in a single logging pass. FIG. 5 illustrates a complete cycle of data acquisition typical of the MR Explorer. Typically, six frequencies are applied, with trainlets being observed at each frequency. Frequencies are indexed according to decreasing frequency (i.e. $f_1>f_2>f_3>f_4>f_5>f_6$). TL represents the trainlets. The sequence L+TL (501) represent a long echo train followed by short trainlets. A long echo train can have a duration of 430 ms, with accompanying short trainlets having TE=0.6 ms, NE=16, and TW=20 ms, in 9 PAP pairs (18 trainlets). Sequences TL2, TL3 and TL4 (referred to as 502, 503, and 504) respectively, represent short trainlets. In the exemplary cycle shown in FIG. 5, TL2 represent short trainlets having TE=0.6 ms, NE=16, and TW=50 ms, in 3 PAP pairs (6 trainlets). TL3 represent short trainlets having TE=0.6 ms, NE=16, and TW=100 ms, in 3 PAP pairs (6 trainlets). TL4 represent short trainlets having TE=0.6 ms, NE=16, and TW=240 ms, in 2 PAP pairs (4 trainlets). Those versed in the art will recognize that other cycle configurations than that illustrated in FIG. 5 can also be used.

The complete cycle of FIG. 5 yields multiple echo trains and trainlets. Some of these are fully polarized, while others are partially polarized. The trainlets are only about 10 ms in duration and are acquired with a very short TW, usually in a range of approximately 20–30 ms. By comparison, long echo trains are typically several hundred ms in duration and are acquired using long TW in the range of 1 s<TW<15 s. Short-TW, short-length trainlets typically weigh more heavily on short $T_2$ components, while long TW, long-length echo trains contain more information about long $T_2$ components. When one simultaneously inverts all echoes in the long echo trains and in the trainlets in one single processing step using a least-squares type of minimization algorithm, each echo in the long echo train or trainlet is weighted equally (or equally in the sense of the same standard deviation of noise). Because of the much larger number of echoes in the long echo train compared to that in the short trainlets, the former are given more weight than the latter.

If a data-fitting model does not take into consideration the dependence of borehole contamination on DOI, not all echo trains and trainlets data will fit consistently with the data-fitting model. Therefore, for depth ranges where the borehole contamination is absent, $\chi^2$ should behave normally for all echo trains. For depth range where borehole contamination occurs to some frequency data at some frequencies, it is expected that these contaminated echo trains may not fit the model well. This shows up as an increased misfit, hereby defined as CHI. The misfit resulting from borehole contamination is usually more evident for the short relaxing components and for echo trains with smaller N.

Figure 6:
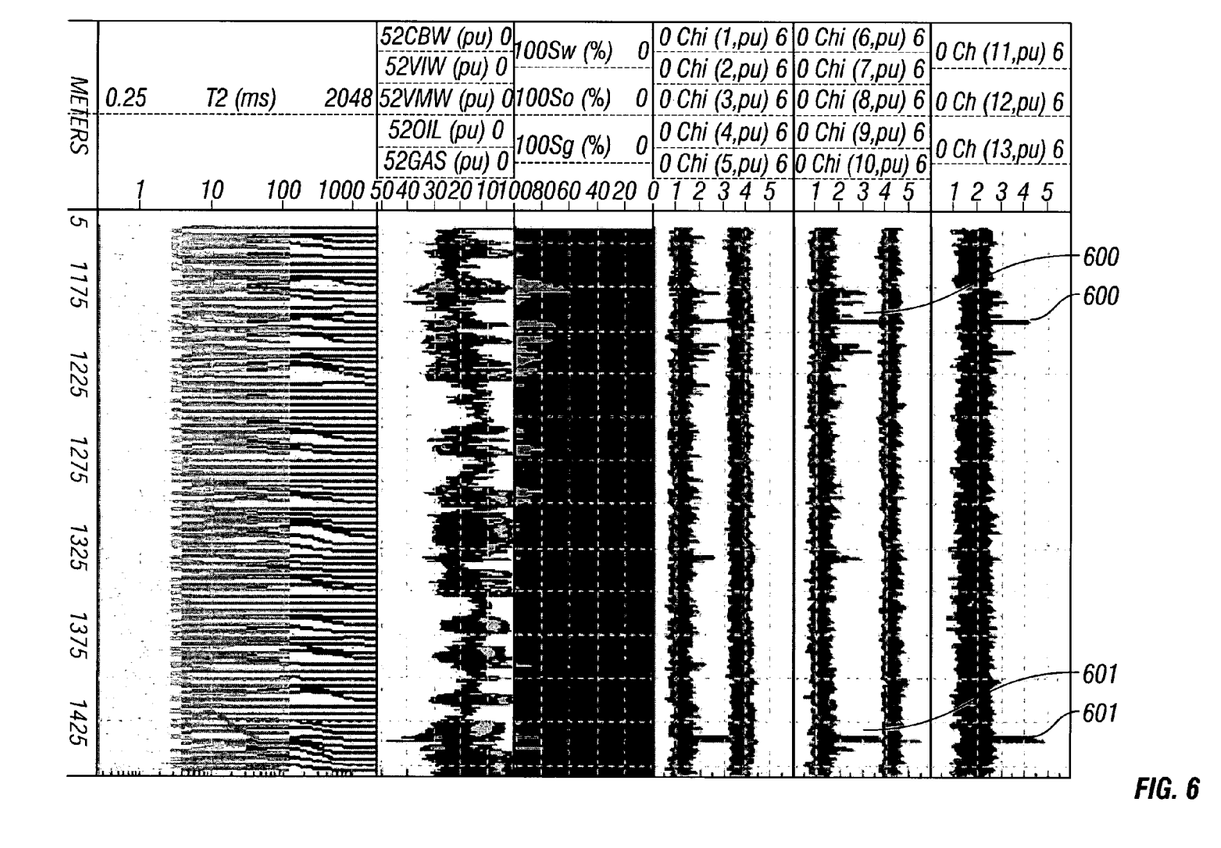
FIG. 6 is an example of the chi-squared indicator method for borehole correction.

FIG. 6 shows an example of the CHI indicator for borehole contamination. Spikes 600 correspond to the mismatched fitting results with respect to the trainlet data. The CHI anomalies can be checked against the standard deviation of noise for the same echo trains. A flag indicating borehole contamination is raised at depth $d_i$ if 1) the noise standard deviation $\sigma_i$ at this depth $d_i$ is substantially the same as the $\sigma_j$ at most of the other depths $d_j$, and 2) $CHI_i >> CHI_j$ occurs for trainlets obtained at $i^{th}$ frequencies at the same depth $d_i$.

Several methods of determining the borehole mud relaxation time $T_{2mud}$ are discussed in U.S. Pat. No. 6,603,310, of Georgi et al., having the same assignees as the present invention. In the present invention, a new, independent method enables determining $T_{2mud}$ when multiple DOI data are available.

A first exemplary method enables $T_{2mud}$ determination when the deepest DOI (corresponding to the lowest frequency) is not contaminated. For this lowest frequency, $f_L$, the trainlet echoes are expressible as $$ECHO_k \approx \sum_i \phi_{iF} R_1(T_{2int,F,i}) R_3(T_{1,F,i}, TW) \tag{12}$$

where the approximation $R_2 \approx 1$ is used in Eq. (1). For higher frequencies $f_j > f_L$, DOI are smaller and the sensitive volumes closer to the measurement device and hence overlap the borehole, leading to signal contamination. The corresponding trainlet for this contaminated signal is expressible as $$ECHO_k = \sum_i \phi_{iF}(1 - \Delta_{f_j}) R_1(T_{2int,F,i}) R_3(T_{1,F,i}, TW) + \tag{13}$$
$$\sum_i \phi_{imud} \Delta_{f_j} R_1(T_{2int,mud,i}) R_3(T_{1,mud,i}, TW)$$

where the first term is from the formation and the second term is from the mud. By considering the trainlets acquired using two frequencies, $f_j$ and $f_{j+1}$, both of which yield contaminated signals but with different degrees of contamination, the echo difference between the two trainlets is $$\Delta E_k = \sum_i \phi_{iF}(\Delta_{f_{j+1}} - \Delta_{f_j}) R_1(T_{2int,F,i}) R_3(T_{1,F,i}, TW) + \tag{14}$$
$$\sum_i \phi_{imud}(\Delta_{f_j} - \Delta_{f_{j+1}}) R_1(T_{2int,mud,i}) R_3(T_{1mud,i}, TW)$$

The percentage of liquid in the per-unit-volume mud is typically much higher than that in the per-unit-volume formation. Hence, $$\phi_{mud} >> \phi_F. \tag{15}$$

Furthermore, if the formation contains mainly fluids having the longer relaxation time (i.e. fluids typically found in producing reservoirs), the relation, $$R_3(T_{1mud}, TW) >> R_3(T_{1,F}, TW), \tag{16}$$

is valid for trainlets having a short TW. Thus, the first term in Eq. (14) is considered much smaller than the second term. Consequently, Eq. (14) can be approximated to obtain $$\Delta E_k \approx \sum_i \phi_{i,mud}(\Delta_{f_j} - \Delta_{f_{j+1}}) R_1(T_{2mud,i}) R_3(T_{1mud,i}, TW). \tag{17}$$

Eq. (17) explicitly shows that the echo difference between trainlets obtained at adjacent frequencies (i.e., a selected frequency and an adjacent frequency) is mostly due to contributions from the borehole mud. In order to further simplify processing, $\phi_{imud}$ and $R_3(T_{1mud,i}, TW)$ are typically lumped together as the term $\phi'_{imud}$. Eq. (17) can now be rewritten as $$\Delta E_k = (\Delta_{f_j} - \Delta_{f_{j+1}}) \sum_i \phi'_{i,mud} R_1(T_{2mud,i}). \tag{18}$$

A $T_{2mud}$ distribution can thus be obtained by performing a simple linear inversion on $\Delta E_k$.

A second method enables $T_{2mud}$ determination in the case where signals obtained at one frequency is affected by the borehole, but signals obtained at a second frequency is not. Returning to Eqs. (12) and (13) and following the same arguments as those described for the first method, the echo difference between the two frequencies is simply identical to deleting $\Delta_{f_{j+1}}$ from Eq. (18), obtaining:

$$\Delta E_k = \Delta_f \sum_i \phi'_{i,mud} R_1(T_{2mud,i}) \tag{19}$$

Eq. (19) can thus be used to determine $T_{2mud}$ where one frequency is unaffected by borehole contamination.

In a third method of $T_{2mud}$ determination, the computation of $\Delta E_k$ is repeated for different frequency pairs. An addition difference between echoes at a third (additional) and fourth (adjacent to the third) frequency are involved. It is possible that the third and fourth frequency may have a common value with either the first or the second frequency. Either Eq. (18) or Eq. (19) can be used. Subsequently linear inversion can be performed on the obtained $\Delta E_k$ values. Since $T_{2mud}$ is independent of frequency, the estimates of the mud $T_2$ obtained at all these different frequency pairs should be consistent. This third method therefore can be used to provide a quality check of the prior $T_{2mud}$ methods.

The j and j+1 indices in Eqs. (14), (17), and (18) are not restricted to only being two adjacent frequencies. Any two frequencies in the multi-frequency data pool can be used to perform the analysis. Furthermore, because mud T2 property is not expected to vary from depth to depth, therefore, large vertical stacking can be applied to the $\Delta E_k$ data to ensure the high SNR before inversion processing is performed.

In a further application of the method of the present invention, one can determine the fraction of contaminated sensitive volume. This determination can be performed either 1) at all frequencies if at least one frequency data is not contaminated, or 2) at all frequencies if all frequency data are contaminated.

In the following discussion for determining the fraction of contaminated sensitive volume, the following terminology is used: $SE_{FORM}$ denotes the $SE_{trainlet}$ derived from the trainlet of the non-contaminated frequency (Eq. (12)) which is contributed from formation only. $SE_{FB}(F)$ denotes the $SE_{trainlet}$ derived from the contaminated trainlet (Eq. (13)) which is contributed from formation and borehole mud. Thus, for the case in which at least one frequency data is not contaminated, Eq. (13) can be rewritten as:

$$SE_{FB}(f_j) = (1-\Delta_{f_j})SE_{FORM} + \Delta_{f_j}SE_{mud}, \qquad (20)$$

where $SE_{mud}$ is a hypothetical trainlet response to a sensitive volume filled with 100% mud. Knowledge of $T_1$ and $T_2$ values of the mud enables quantitative forward modeling of $SE_{mud}$. $T_{2mud}$ is obtainable using the methods described above. The $T_1$ of the mud is related to $T_2$ of the mud through a linear relationship: $T_{1mud} = \alpha T_{2mud}$, where $\alpha=1$ can be used as a default value. $SE_{FORM}$ is computed by summing all echoes in the non-contaminated trainlet, and $SE_{FB}$ is computed from summing all echoes in the contaminated trainlet. Once $SE_{FORM}$, $SE_{mud}$ and $SE_{FB}$ quantities are determinable, the fraction of contamination, $\Delta_{f_j}$, for frequency $f_j$ is determined by solving Eq. (20) for $\Delta f_j$, thereby obtaining Eq. (21) below:

$$\Delta_{f_j} = \frac{SE_{FB}(f_j) - SE_{FORM}}{SE_{mud} - SE_{FORM}}. \qquad (21)$$

In the case where all frequency data are contaminated, a non-contaminated reference porosity is required to obtain any one of the $\Delta_{f_j}$. This can be labeled $\Delta_{f_K}$ for clarity. Methods for using reference porosity to obtain $\Delta_{f_K}$ are discussed in prior art. Once reference porosity, together with the forward modeled $SE_{mud}$ and the computed $SE_{FB}(f_j)$ from the corresponding frequency's trainlet, is determined, the $SE_{FORM}$ is computable using $$SE_{FORM} = \frac{SE_{FB}(f_K) - \Delta_{f_K} \cdot SE_{FORM}}{1 - \Delta_{f_K}}, \qquad (22)$$

Substituting Eq. (22) into Eq. (21) yields $\Delta_{f_j}$ values at the remaining frequencies.

Once the parameters $\Delta_{f_j}$ of each frequency and $T_{2mud}$ are quantified, the mud contribution to the time domain echo data can be subtracted from the raw echo train, thereby enabling a correction for borehole contamination in multi-frequency echo data. Subsequently, the remaining signal can be rescaled to that of a signal from a 100% sensitive volume $$E_{Clean,k} = \frac{ECHO_k - \sum_i \phi_{imud}\Delta_{f_j}R_1(T_{2mud,i})R_2R_3(T_{1mud,i}, TW)}{1 - \Delta_{f_j}}. \qquad (23)$$

Although borehole contamination information is derived from the trainlets only, the correction (Eq. (23)) is applicable to all other echo trains.

Corrected echo trains can be processed to obtain independent porosity and other formation properties such as BVI and effective porosity using known prior art methods. The corrected multiple-frequency, multiple-echo trains can be inverted simultaneously to obtain comprehensive fluid properties (such as fluid types and saturation) and formation properties.

The invention has been described with reference to a logging tool conveyed on a wireline. The method of the present invention is equally applicable for use with multi-frequency NMR logging tools conveyed on a drillstring, slickline or coiled tubing.

While the foregoing disclosure is directed to the specific embodiments of the invention, various modifications will be apparent to those skilled in the art. It is intended that all such variations within the scope of the appended claims be embraced by the foregoing disclosure.

What is claimed is:

1. A method of well logging comprising:
   (a) conveying a NMR logging tool into a borehole in an earth formation;
   (b) acquiring NMR signals from a plurality of different sensitive volumes; and
   (c) estimating a contamination of NMR signals in at least one of the sensitive volumes due to a fluid within the borehole.

2. The method of claim 1 wherein said NMR logging tool comprises a multifrequency tool and wherein said logging tool operates at a different frequency for each of said plurality of sensitive volumes.

3. The method of claim 1 further comprising using a field shifting magnet on said NMR logging tool for obtaining said plurality of different sensitive volumes.

4. The method of claim 1 wherein said estimating the contamination due to the fluid within the borehole further comprises:
   (i) determining a porosity associated with each of said sensitive volumes, and
   (ii) comparing said determined values of porosity.

5. The method of claim 4 wherein determining said porosity associated with each of said different sensitive volumes further comprises inverting the NMR signals.

6. The method of claim 1 wherein said estimating the contamination due to the fluid in the borehole further comprises summing said NMR signals from each of said plurality of sensitive volumes to provide a sum of echoes.

7. The method of claim 6 wherein said NMR signals comprise trainlets with a short wait time.

8. The method of claim 7 wherein one of said trainlets for a particular sensitive volume has no signal from said fluid within the borehole, the method further comprising:
   (i) determining a difference between said sum of echoes for said particular sensitive volume and said sum of echoes for a sensitive volume different from said particular sensitive volume; and
   (ii) determining from said difference a fraction of said different sensitive volume including the fluid within the borehole.

9. The method of claim 8 wherein determining said fraction is based on an obtained value of $T_1$ and $T_2$ of said fluid within the borehole.

10. The method of claim 6 further comprising selecting a wait time for said acquiring so that nuclear spins in said fluid within the borehole are substantially polarized and nuclear spins immovable fluids in said earth formation are substantially unpolarized.

11. The method of claim 6 wherein a number of echoes used in providing said sum of echoes satisfies the relation $$\exp\left(-\frac{\gamma^2 G^2 TE^2 D_i}{12} NE \cdot TE\right) \approx 1$$

wherein $\gamma$ is a gyromagnetic ratio, G is a gradient of a static magnetic field, TE is an intercho spacing, $D_i$ is a diffusivity of a fluid in the sensitive volume and NE is the number of echoes.

12. The method of claim 11 wherein said sum of echoes is primarily comprised of fast relaxing signals including a signal from said fluid within the borehole.

13. The method of claim 6 further comprising:
(i) determining a difference between said sum of echoes for a reference sensitive volume and said sum of echoes for a sensitive volume different from said reference sensitive volume; and
(ii) determining a fraction of said different sensitive volume having the fluid within the borehole from (A) said difference, and, (B) a reference porosity for said reference sensitive volume.

14. The method of claim 1 wherein said NMR signals comprise regular echo trains and trainlets, and estimating the contamination due to the fluid within the borehole further comprises:
(i) inverting simultaneously said regular echo trains and trainlets, and (ii) determining a goodness of fit of said regular echo trains and trainlets.

15. The method of claim 1 wherein said NMR signals comprise trainlets, the method further comprising determining a relaxation time ($T_2$) distribution of said fluid within the borehole from said trainlets.

16. The method of claim 15 wherein determining said $T_2$ distribution of said fluid within the borehole further comprises determining a difference of an echo of one of said trainlets from a first one of said plurality of sensitive volumes with a corresponding echo of a trainlet from a second sensitive volume adjacent to said first sensitive volume.

17. The method of claim 16 wherein a trainlet for one of said first and second sensitive volumes has no signal from said fluid within the borehole.

18. The method of claim 16 further comprising determining an additional difference of an echo of one of said trainlets from a third one of said plurality of sensitive volumes with a corresponding echo of a trainlet from a fourth sensitive volume adjacent to said third sensitive volume, the method further comprising inverting said difference and said additional difference.

19. The method of claim 1 further comprising:
(i) determining a contribution to said NMR signals for each of said sensitive volumes from said fluid within the borehole; and
(ii) correcting said NMR signals for each of said sensitive volumes based on said contribution to provide corrected echo signals for at least one of said plurality of sensitive volumes.

20. The method of claim 19 further comprising rescaling said corrected NMR signals for at least one of said plurality of sensitive volumes to correspond to 100% sensitive volume, thereby providing resealed NMR signals.

21. The method of claim 20 further comprising determining from said rescaled NMR signals at least one of (i) a porosity of said formation, (ii) a BVI of said earth formation, (iii) an effective porosity of said earth formation, (iv) a fluid type and saturation.

22. The method of claim 1 further comprising conveying said NMR logging tool into the borehole on a wireline.

23. A logging apparatus for evaluating an earth formation comprising:
(a) a nuclear magnetic resonance (NMR) tool configured to be conveyed in a borehole, said NMR tool configured to produce NMR signals from a plurality of sensitive volumes in said earth formation;
(b) a receiver on said NMR tool configured to receive said echo signals from said plurality of sensitive volumes; and
(d) a processor configured to determine from said NMR signals an indication of a presence of a fluid within the borehole in at least one of said sensitive volumes.

24. The logging apparatus of claim 23 further comprising a transmitter configured to operate at a plurality of frequencies.

25. The logging apparatus of claim 23 further comprising a field shifting magnet configured to shift a static magnetic field produced by a primary magnet on said logging apparatus.

26. The logging apparatus of claim 23 wherein said processor is configured to determine said indication by further determining a porosity associated with each of said different sensitive volumes, and wherein said processor is further configured to compare said determined values of porosity.

27. The logging apparatus of claim 26 wherein said processor is further configured to determine said porosity associated with each of said different sensitive volumes by inverting said NMR signals.

28. The logging apparatus of claim 23 wherein said processor is configured to determine said indication by summing said NMR signals from each of said plurality of sensitive volumes.

29. The logging apparatus of claim 28 wherein said NMR signals comprise trainlets with a short wait time.

30. The logging apparatus of claim 29 wherein a number of echoes used in performing said summation satisfies the relation $$\exp\left(-\frac{\gamma^2 G^2 TE^2 D_i}{12} NE \cdot TE\right) \approx 1$$

wherein $\gamma$ is a gyromagnetic ratio, G is a gradient of a static magnetic field, TE is an intercho spacing, $D_i$ is a diffusivity of any of the fluids in the sensitive volume and NE is the number of echoes included in the summation.

31. The logging apparatus of claim 29 wherein one of said trainlets from a particular sensitive volume has no signal from said fluid, in the borehole and wherein the processor is further configured to:
(i) determine a difference between said sum of echoes from said particular sensitive volume and said sum of echoes from a sensitive volume different from said particular sensitive volume; and
(ii) determine from said difference a fraction of said different sensitive volume having the fluid in the borehole.

32. The logging apparatus of claim 31 wherein said processor is configured to determine said fraction based on an obtained value of $T_1$ and $T_2$ of said fluid in the borehole.

33. The logging apparatus of claim 28 wherein said processor is further configured to determine:
   (i) a difference between said sum of echoes from a reference sensitive volume and said sum of echoes from a sensitive volume different from said reference sensitive volume; and
   (ii) a fraction of said different sensitive volume having the fluid in the borehole from (A) said difference, and (B) a reference porosity for said reference sensitive volume.

34. The logging apparatus of claim 23 wherein said NMR signals comprise regular echo trains and trainlets, and said processor is further configured to reduce said NMR signals by:
   (i) simultaneously inverting said regular echo trains and trainlets, and
   (ii) determining a goodness of fit of said regular echo trains and trainlets.

35. The logging apparatus of claim 23 wherein said NMR signals comprise trainlets, and wherein said processor is further configured to determine a relaxation time ($T_2$) distribution of said fluid in the borehole from said trainlets.

36. The logging apparatus of claim 35 wherein said processor is configured to determine said $T_2$ distribution of said fluid in the borehole based on determining a difference of an echo of one of said trainlets from a first one of said plurality of sensitive volumes with a corresponding echo of a trainlet from a second sensitive volume adjacent to said first one of said plurality of sensitive volumes.

37. The logging apparatus of claim 23 wherein said processor is further configured to:
   (i) determine a contribution to said NMR signals to each of said plurality of sensitive volumes from said fluid within the borehole; and
   (ii) correct said NMR signals from each of said plurality of sensitive volumes based on said contribution to provide corrected NMR signals from at least one of said plurality of sensitive volumes.

38. The logging apparatus of claim 37 wherein said processor is further configured to invert said corrected NMR signals from said at least one sensitive volume to obtain at least one of (A) a total porosity, (B) a clay bound water, and (C) a bound volume irreducible.

39. The logging apparatus of claim 23 further comprising a conveyance device configured to convey said NMR logging tool into the borehole, the conveyance device being selected from (i) a wireline, and (ii) a drilling tubular.

40. The logging apparatus of claim 23 wherein said processor is located at one of (i) a surface location, and, (ii) a downhole location.

41. The apparatus of claim 23 wherein each of the sensitive volumes has an associated depth of investigation.

* * * * *